United States Patent
Lambert

(10) Patent No.: US 7,475,891 B2
(45) Date of Patent: Jan. 13, 2009

(54) PITMAN ARM AND IDLER ARM SUPPORT DEVICE

(75) Inventor: Justin Lambert, 1800 Art St., Bakersfield, CA (US) 93312

(73) Assignee: Justin Lambert, Bakersfield, CA (US)

( * ) Notice: Subject to any disclaimer, the term of this patent is extended or adjusted under 35 U.S.C. 154(b) by 237 days.

(21) Appl. No.: 11/106,855

(22) Filed: Apr. 14, 2005

(65) Prior Publication Data

US 2006/0232035 A1 Oct. 19, 2006

(51) Int. Cl.
 *B62D 7/20* (2006.01)
(52) U.S. Cl. .............................. 280/93.51; 280/93.511
(58) Field of Classification Search ............ 280/93.511, 280/93.51, 93.502, 93.508, 93.503
See application file for complete search history.

(56) References Cited

U.S. PATENT DOCUMENTS

| 2,427,340 | A | * | 9/1947 | Allison ........................ 180/435 |
|---|---|---|---|---|
| 2,549,178 | A | * | 4/1951 | Dear ........................... 280/511 |
| 2,944,829 | A | * | 7/1960 | Herbenar ................ 280/93.509 |
| 3,790,195 | A | | 2/1974 | Herbenar |
| 3,945,737 | A | | 3/1976 | Herbenar |
| 4,070,121 | A | | 1/1978 | Graham |
| 4,327,926 | A | | 5/1982 | Suganuma |
| 4,563,015 | A | | 1/1986 | Lenhard-Backhaus et al. |
| 4,610,461 | A | * | 9/1986 | Guzzetta ............... 280/124.134 |
| 4,714,262 | A | * | 12/1987 | Wood .................... 280/86.758 |
| 5,267,625 | A | | 12/1993 | Shimizu |
| 5,529,316 | A | * | 6/1996 | Mattila ..................... 280/93.51 |
| 5,820,147 | A | | 10/1998 | Rohweder et al. |
| 6,298,938 | B1 | | 10/2001 | Klaiber et al. |
| 6,561,715 | B2 | * | 5/2003 | Wasylewski et al. .......... 403/71 |
| 2006/0113739 | A1 | * | 6/2006 | Spetz et al. ............ 280/93.514 |

* cited by examiner

*Primary Examiner*—Eric Culbreth
(74) *Attorney, Agent, or Firm*—Klein, DeNatale, Goldner, Cooper, et al.; James M. Duncan, Esq.

(57) ABSTRACT

A device provides additional support for the pivot stud of a pitman arm and/or idler arm in center link steering systems by capturing the pivot stud and inhibiting lateral motion of the pivot stud. The device may comprise a separate bracket member attached as a separate unit from the pitman arm or idler arm. Alternatively, the device may comprise an integrated member of the pitman arm or idler arm.

17 Claims, 7 Drawing Sheets

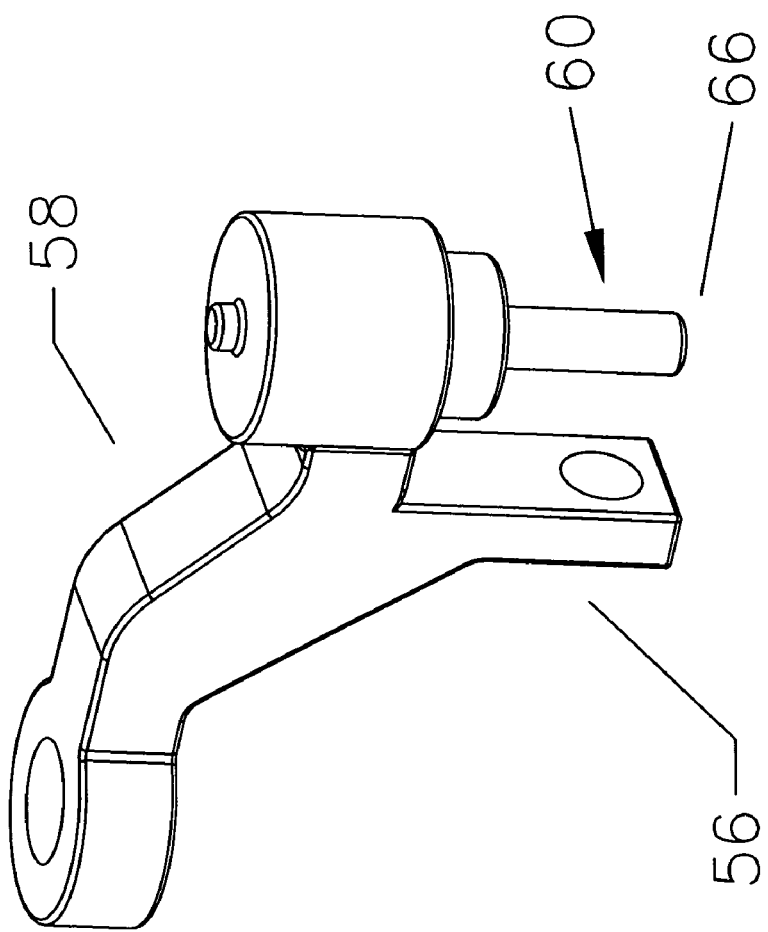

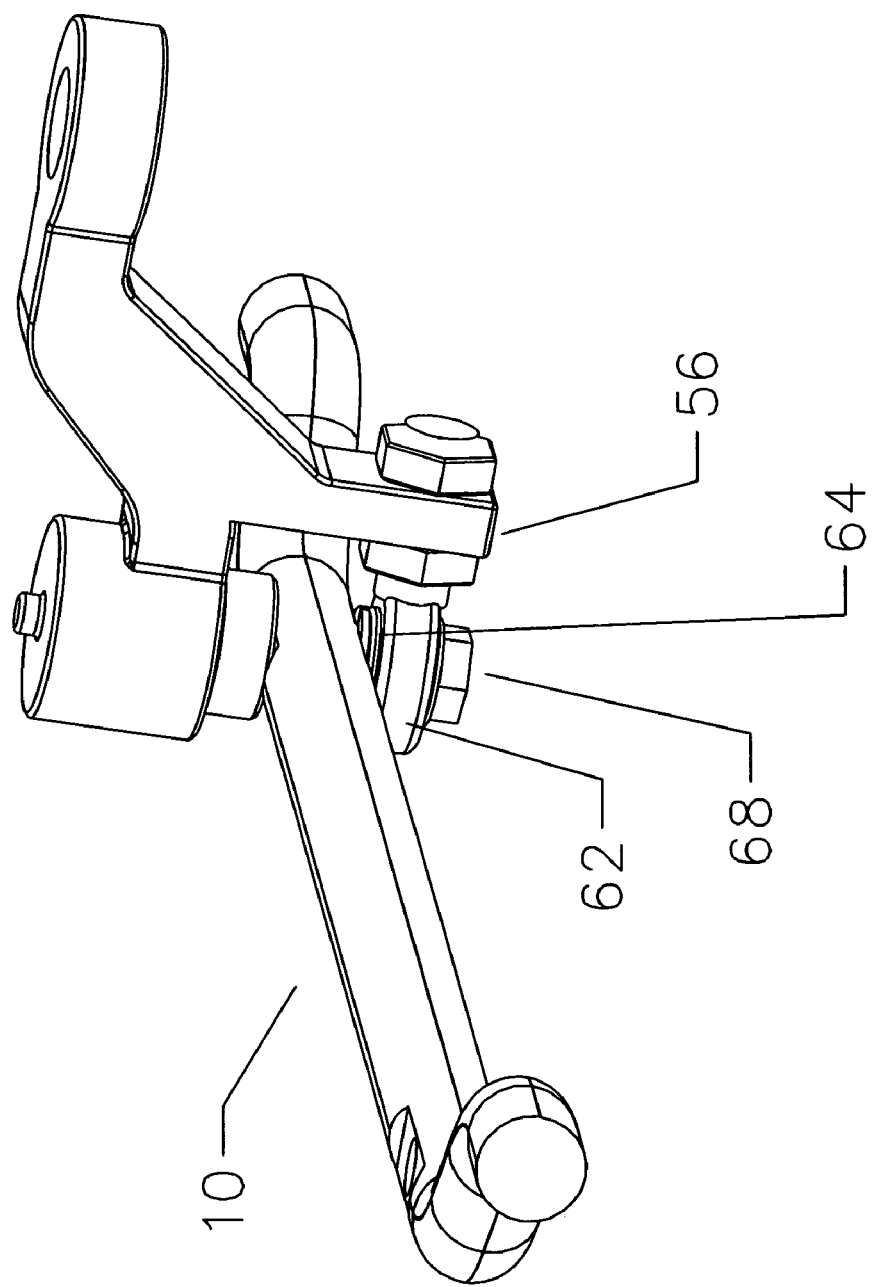

PITMAN ARM AND IDLER ARM SUPPORT DEVICE

BACKGROUND OF THE INVENTION

The present invention generally relates to vehicular steering systems. The present invention more specifically relates to various embodiments of a device which supports pitman arms and idler arms of center link steering systems.

In conventional vehicle steering systems (as opposed to rack and pinion systems), the steering wheel is connected to the steering box by a steering column. The steering box has an arm attached to the output shaft called a pitman arm. The pitman arm is connected to one end of the center link, also referred to as the drag link. At the other end of the center link is an idler arm. When actuated by the steering box, the pitman arm moves the center link in a lateral path. Inner tie-rods are attached to either end of the center link. The inner tie-rods are connected to outer tie-rods which are connected to steering knuckles which turn the front wheels of the vehicle. The pitman arm and idler arm are each attached to the center link with a pivot stud. The pivot stud typically comprises a ball end which is enclosed within a sealed housing of the pitman arm or idler arm, allowing rotation of the pivot stud within the housing.

Lateral motion (as defined below) of the pivot stud can result in excessive wear of the ball of the pivot stud, thereby causing sloppy and inaccurate steering response and precluding proper alignment of the front wheels of the vehicle resulting in accelerated tire wear. The known solution to the wear in the pivot stud joint is to replace the pitman arm and idler arm. However, this solution can be expensive. In addition, in some vehicles, the pivot stud joint wears rapidly, requiring frequent replacement of the pitman arm and idler arm to prevent inaccurate steering response and tire wear.

SUMMARY OF THE INVENTION

The apparatus disclosed herein is a support for a pivot stud in a steering apparatus, which addresses the problem identified above by providing additional support to the pivot stud. The type of steering apparatus where an embodiment of this apparatus may be used is one in which the steering apparatus comprises a center link and usually two attachment members which are pivotally attached to the center link by the pivot stud. The two attachment members are commonly known as the pitman arm and the idler arm. The pitman arm provides the turning linkage between the steering box of the vehicle and the center link, and the idler arm provides additional support for the center link as it is actuated back and forth by the pitman arm. Tie-rods are attached to the center link, which act to turn the wheels of the vehicle as the center link is actuated back and forth. The pivot stud comprises a first end and a second end. The first end of the pivot stud is generally rotationally attached within a housing of the pitman arm or idler arm. The second end of the pivot stud secures the center link to the pitman arm or idler arm. The second end of the pivot stud secures the center link to the pitman arm or idler arm.

An embodiment of the apparatus disclosed herein comprises a bracket member which provides lateral support to the second end of the pivot stud. "Lateral support" is hereinafter defined as inhibiting movement (i.e, "lateral motion") of the pivot stud in a direction generally front to back or oblique relative to the vehicle. The apparatus captures the second end of the pivot stud, thereby inhibiting lateral motion of the pivot stud, but allowing the pivot stud to pivot as required to transmit steering motion to the center link. In one embodiment of the apparatus, the bracket member is integral to the body of the attachment member. However, in another embodiment, the bracket member is a separate member apart from the body of the attachment member.

The lateral support to the pivot stud may be provided by a housing on the bracket member, where the housing comprises a bearing for engaging the second end of the pivot stud. The bearing may be a spherical bearing and the pivot stud may be retained within the spherical bearing by a shank nut having a threaded internal surface and a smooth external surface, where the threads of the pivot stud engage the threaded internal surface of the shank nut.

BRIEF DESCRIPTION OF THE DRAWINGS

FIG. 13 shows an attachment member having an integral bracket member.

FIG. 14, shows an alternative embodiment of the disclosed support device utilizing the integral bracket member of FIG. 13.

DETAILED DESCRIPTION OF THE EMBODIMENTS

Figure 1:
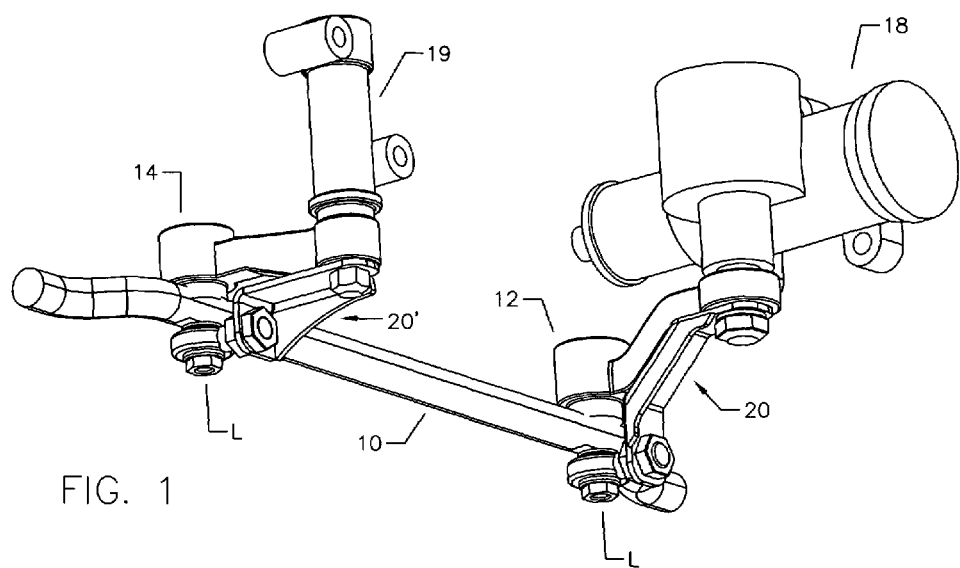
FIG. 1 shows a front view of an embodiment of the disclosed support device as installed on related components of a center link steering apparatus.
Figure 2:
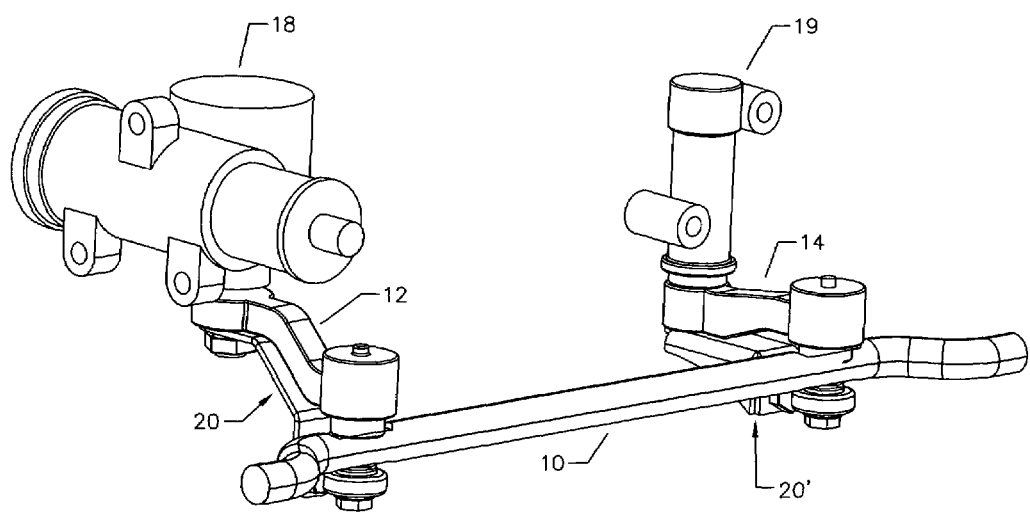
FIG. 2 shows a back view of an embodiment of the disclosed support device as installed on related components of a center link steering apparatus.
Figure 3:
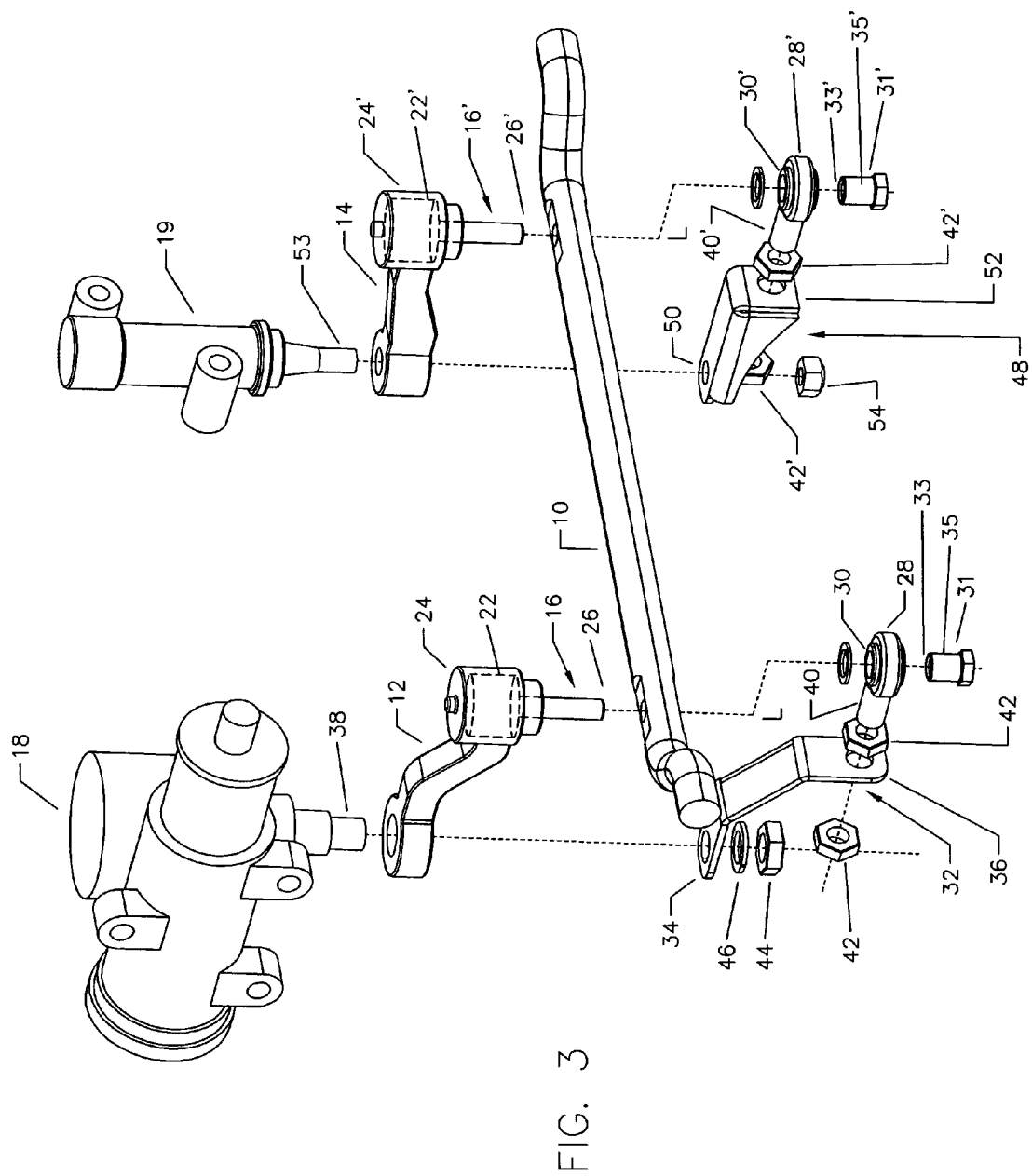
FIG. 3 shows an exploded view of an embodiment of the disclosed support device as installed on related components of a center link steering apparatus.
Figure 4:
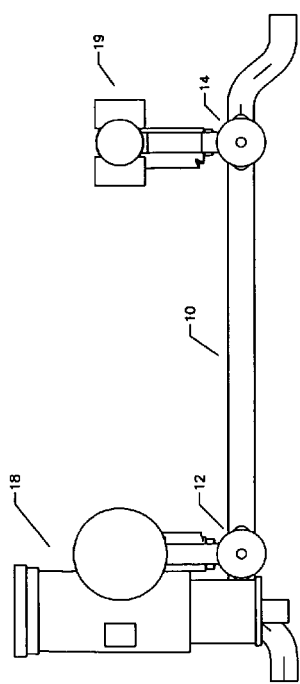
FIG. 4 shows a top view of a steering apparatus having an embodiment of the disclosed support device installed on the pitman arm and idler arm.
Figure 5:
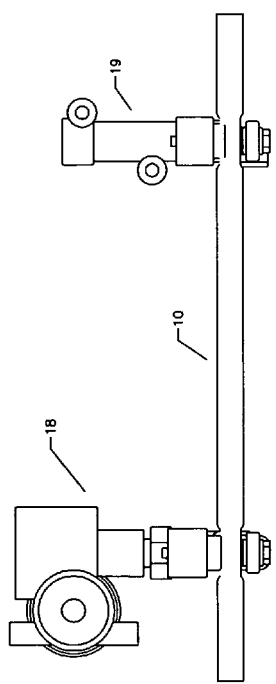
FIG. 5 shows a front view of a steering apparatus having an embodiment of the disclosed support device installed on the pitman arm and idler arm.
Figure 6:
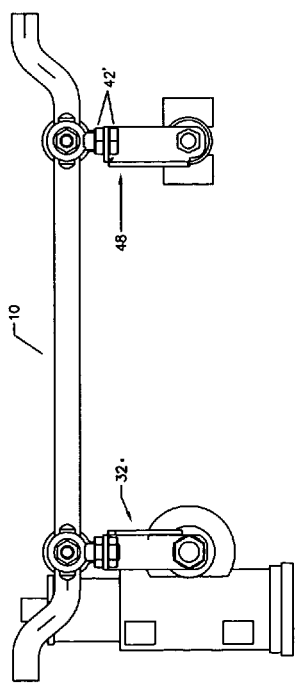
FIG. 6 shows a bottom view of a steering apparatus having an embodiment of the disclosed support device installed on the pitman arm and idler arm.
Figure 7:
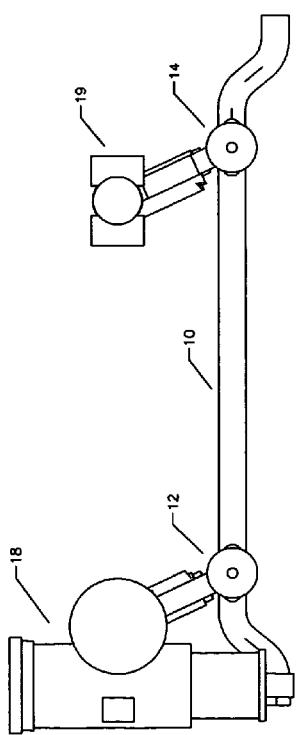
FIG. 7 shows a top view of a steering apparatus having an embodiment of the disclosed support device installed on the pitman arm and idler arm, where the steering apparatus is turning right.
Figure 8:
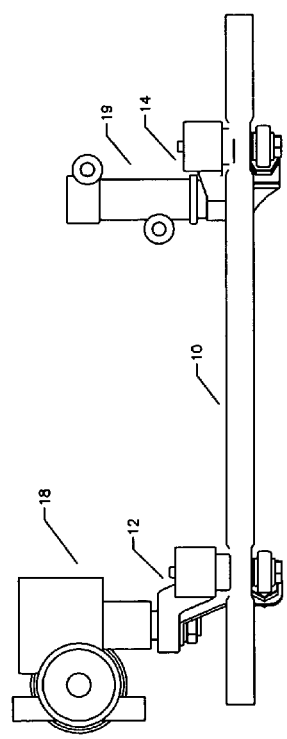
FIG. 8 shows a front view of a steering apparatus having an embodiment of the disclosed support device installed on the pitman arm and idler arm, where the steering apparatus is turning right.
Figure 9:
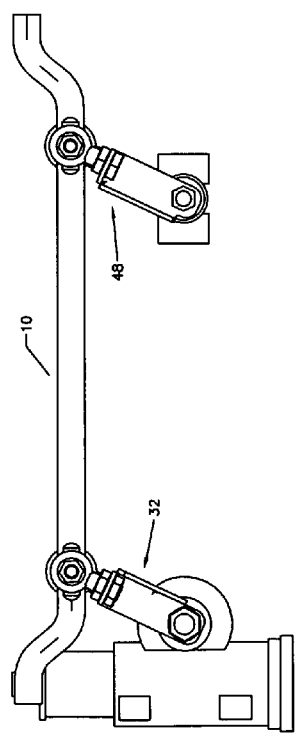
FIG. 9 shows a bottom view of a steering apparatus having an embodiment of the disclosed support device installed on the pitman arm and idler arm, where the steering apparatus is turning right.
Figure 10:
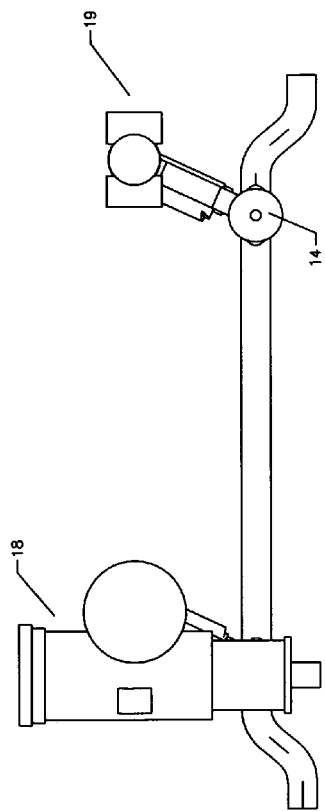
FIG. 10 shows a top view of a steering apparatus having an embodiment of the disclosed support device installed on the pitman arm and idler arm, where the steering apparatus is turning left.
Figure 11:
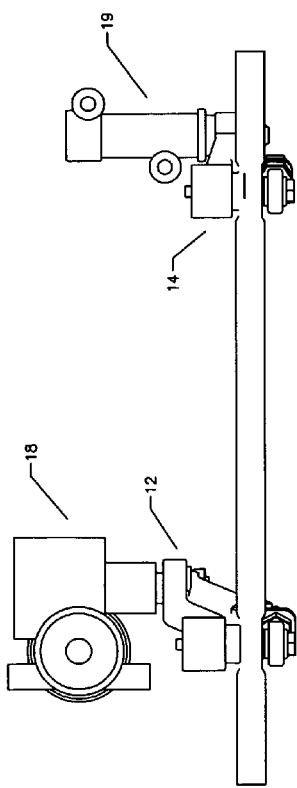
FIG. 11 shows a front view of a steering apparatus having an embodiment of the disclosed support device installed on the pitman arm and idler arm, where the steering apparatus is turning left.
Figure 12:
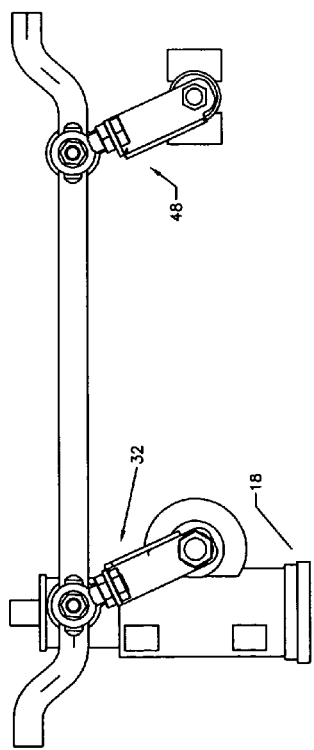
FIG. 12 shows a bottom view of a steering apparatus having an embodiment of the disclosed support device installed on the pitman arm and idler arm, where the steering apparatus is turning left.

Referring now specifically to the drawings, FIGS. 1 and 2 depict a type of steering apparatus where an embodiment of the disclosed apparatus may be used. This type of steering apparatus may comprise a center link 10 and two attachment members commonly known as the pitman arm 12 and the idler arm 14. The pitman arm 12 and the idler arm 14 are each pivotally attached to the center link 10 by a pivot stud 16 and 16', as shown in FIG. 3. The pitman arm 12 provides the linkage between the steering box 18 of the vehicle and the center link 10. The idler arm 14 provides additional support for the center link 10 as it is moved back and forth by the rotation of the pitman arm 12 by the steering box 18. The idler arm 14 is supported by the idler arm pivot bracket 19. The steering box 18 and the idler arm pivot bracket 19 are attached to the chassis of the vehicle.

FIG. 1 shows a front view of an embodiment of the disclosed support device 20 as installed on pitman arm 12. Similarly, FIG. 1 also shows an embodiment of the disclosed support device 20' as installed on idler arm 14. As shown in greater detail in FIG. 3, pivot stud 16 comprises a first end 22, such as a ball end, which is rotationally attached to the attachment member, i.e., pitman arm 12. As known by those skilled in the art, the rotational attachment of the pivot stud 16 to the attachment member may be accomplished by enclosing the first end 22 and 22' of the pivot stud within housing 24, 24'. Pivot stud 16 further comprises a second end 26 which penetrates and extends below the center link 10. Support device 20 comprises lateral support means for the second end 26 of the pivot stud 16. The lateral support means captures the second end 26, thereby acting to limit motion of the pivot stud 16 to rotation about its axis L, and inhibiting lateral motion of the pivot stud, that is motion which is oblique to axis L.

The lateral support means may comprise a circumferential housing 28, wherein the housing encloses a spherical bearing 30. However, it is to be appreciated that a variety of different lateral support means may be used to capture or support the second end 26 of the pivot stud 16, including a variety of different bearings and bushings.

The lateral support means, such as circumferential housing 28, may be supported by a first bracket 32 for pitman arm 12. First bracket 32 has a first end 34 and a second end 36. As shown in FIG. 3, first end 34 may be adapted to be attached to a first support, such as shaft 38 of steering box 18. Second end 36 may comprise circumferential housing 28 which may support spherical bearing 30 for capturing the second end 26 of the pivot stud 16. The second end 26 of pivot stud 16 may be retained within spherical bearing 30 by a shank nut 31 having a threaded internal surface 33 and a smooth external surface 35. The threads of the pivot stud 16 may then engage the threaded internal surface 33 of the shank nut 31, thereby capturing the pivot stud and providing lateral support.

The circumferential housing 28 may comprise stud 40 which is attached to second end 36 of first bracket 32 with nuts 42 on either side of the first bracket. First end 34 of first bracket 32 may be attached to shaft 38 by nut 44 and lock washer 46. Typically, the existing factory hardware provided for securing a pitman arm 12 to a steering box 18 (i.e., the nut 44 and lock washer 46) may be used for securing first end 34 to shaft 38. As can be seen in FIGS. 1 through 3, first bracket 32 may be configured to generally conform to the shape of pitman arm 12 to allow for attachment of the first end 34 to the shaft 38 of the steering box 18.

Similarly, second bracket 48 has a first end 50 and a second end 52. As shown in FIG. 3, first end 50 may be adapted to be attached to a first support, such as shaft 53 of idler arm pivot bracket 19. Second end 52 may comprise circumferential housing 28' which may support spherical bearing 30' for capturing the second end 26' of the pivot stud 16'. The second end 26' of pivot stud 16' may be retained within spherical bearing 30' by a shank nut 31' having a threaded internal surface 33' and a smooth external surface 35'. The threads of the pivot stud 16' may then engage the threaded internal surface 33' of the shank nut 31', thereby capturing the pivot stud and providing lateral support.

The circumferential housing 28' may comprise stud 40' which is attached to second end 52 with nuts 42'. First end 50 may be attached to shaft 53 by nut 54, which may be the factory provided nut generally provided for holding an idler arm 14 to the shaft 52 of a pivot arm bracket 19. As can be seen in FIGS. 1 through 3, second bracket 48 may be configured to generally conform to the shape of idler arm 14 to allow for attachment of the first end 50 to the shaft 53 of the idler arm pivot bracket 19.

FIGS. 4 through 12 illustrate an embodiment of the disclosed support device 20 may be installed on pitman arm 12 or another embodiment 20' may be installed on idler arm 14, such that the support device pivots together with either the pitman arm or idler arm.

FIG. 13 shows a bracket member 56 may be integrated into the body of a modified pitman arm 58. FIG. 14 shows how bracket member 56 may comprise means for providing lateral support to pivot stud 60. The means for providing lateral support may comprise circumferential housing 62 which may support spherical bearing 64 for capturing the second end 66 of the pivot stud 60. The second end 66 may be retained within spherical bearing 64 by a shank nut 68 which has a threaded internal surface and a smooth external surface 35'. The threads of the pivot stud 66 may then engage the threaded internal surface of the shank nut 68, thereby capturing the pivot stud and providing lateral support. It is to be appreciated that a similar bracket member may be integrated into the body of a modified idler arm, where the bracket member comprises similar means for providing lateral support to the pivot stud of the idler arm.

While the above is a description of various embodiments of the present invention, further modifications may be employed without departing from the spirit and scope of the present invention. For example, the size, shape, and/or material of the various components may be changed as desired. Thus the scope of the invention should not be limited by the specific structures disclosed. Instead the true scope of the invention should be determined by the following claims.

What is claimed is:

1. A support for a pivot stud in a steering apparatus, wherein the steering apparatus comprises a center link which is moved back and forth by operation of a steering box and an attachment member pivotally attached to the center link, the attachment member providing support to the center link as it is moved back and forth, wherein the attachment member comprises a pivot stud for pivotal attachment to the center link, the pivot stud comprising a first end and a second end, wherein the first end is rotationally attached to the attachment member and the second end penetrates through the center link, the support comprising:

a bracket member comprising lateral support means for the second end of the pivot stud.

2. The support of claim 1 wherein the attachment member comprises a pitman arm.

3. The support of claim 1 wherein the attachment member comprises an idler arm.

4. The support of claim 1 wherein the bracket member is integral to the attachment member.

5. The support of claim 1 wherein the bracket member is not integral to the attachment member.

6. The support of claim 1 wherein the bracket member comprises a first end attached to a member of the steering box and the second end comprises the lateral support means for the second end of the pivot stud.

7. The support of claim 6 wherein the second end of the bracket member comprises a circumferential housing retaining a bearing.

8. The support of claim 7 wherein the bearing comprises a spherical bearing.

9. The support of claim 8 wherein the pivot stud has threads, and the pivot stud is retained within the spherical bearing by a shank nut having a threaded internal surface and a smooth external surface, the threads of the pivot stud engaging the threaded internal surface of the shank nut.

10. A support for a pivot stud in a steering apparatus, wherein the steering apparatus comprises a center link spanning between a steering box and an idler arm pivot bracket, wherein the center link is connected to the steering box with a pitman arm and the center link is connected to the idler arm pivot bracket with an idler arm, wherein the pitman arm comprises a pivot stud for pivotal attachment to the center link, the pivot stud comprising an end which penetrates through the center link, the support comprising:

a bracket having a first end and a second end, wherein the first end of the bracket comprises means for attachment to the steering box and the second end of the bracket comprises a lateral support means for the end of the pivot stud.

11. The support of claim 10 wherein the lateral support means comprises a circumferential housing retaining a bearing.

12. The support of claim 11 wherein the bearing comprises a spherical bearing.

13. The support of claim 12 wherein the pivot stud has threads, and the pivot stud is retained within the spherical bearing by a shank nut having a threaded internal surface and a smooth external surface, the threads of the pivot stud engaging the threaded internal surface of the shank nut.

14. A support for a pivot stud in a steering apparatus, wherein the steering apparatus comprises a center link spanning between a steering box and an idler arm pivot bracket, wherein the center link is connected to the steering box with a pitman arm and the center link is connected to the idler arm pivot bracket with an idler arm wherein the idler arm comprises a first end for attachment to the idler arm pivot bracket and a center link attachment end for pivotal attachment to the center link, the center link attachment end comprising a pivot stud, the pivot stud comprising a first end and a second end, wherein the first end is rotationally attached to the center link attachment end and the second end pivotally attaches the center link attachment end to the center link, the support comprising:

a bracket having a first end and a second end, wherein the first end of the bracket is attached to the idler arm pivot bracket and the second end of the bracket comprises a lateral support means for the second end of the pivot stud.

15. The support of claim 14 wherein the lateral support means comprises a circumferential housing retaining a bearing.

16. The support of claim 15 wherein the bearing comprises a spherical bearing.

17. The support of claim 16 wherein the pivot stud has threads, and the pivot stud is retained within the spherical bearing by a shank nut having a threaded internal surface and a smooth external surface, the threads of the pivot stud engaging the threaded internal surface of the shank nut.

* * * * *